(12) United States Patent
Kikuchi et al.

(10) Patent No.: US 6,339,570 B1
(45) Date of Patent: Jan. 15, 2002

(54) OPTICAL PICKUP SYSTEM

(75) Inventors: Ikuya Kikuchi; Takanori Maeda, both of Saitama-ken (JP)

(73) Assignee: Pioneer Electronic Corporation, Tokyo (JP)

( * ) Notice: Subject to any disclaimer, the term of this patent is extended or adjusted under 35 U.S.C. 154(b) by 0 days.

(21) Appl. No.: 09/385,011

(22) Filed: Aug. 27, 1999

(30) Foreign Application Priority Data

Aug. 27, 1998 (JP) ............................................. 10-242149

(51) Int. Cl.$^7$ ................................................. G11B 7/00
(52) U.S. Cl. .................. 369/53.1; 369/53.41; 369/44.41
(58) Field of Search ........................... 369/44.14, 44.23, 369/44.26, 44.28, 44.34, 44.37, 44.41, 47.1, 53.1, 53.11, 53.41, 53.2, 53.22, 53.23, 94, 93, 112.01

(56) References Cited

U.S. PATENT DOCUMENTS 5,956,316 A * 9/1999 Homburg ..................... 369/282
6,172,958 B1 * 1/2001 Mochizuki et al. ......... 369/44.37

* cited by examiner

Primary Examiner—Muhammad Edun
(74) Attorney, Agent, or Firm—Arent Fox Kintner Plotkin & Kahn PLLC

(57) ABSTRACT

A light source is provided for emitting a light beam. The light beam from the light source is applied to a recording and reproducing plane of an optical disc and to a front surface of a transparent substrate of the optical disc. A photodetector is provided for detecting return light beams from the recording and reproducing plane and the front surface. A first signal is generated based on an output signal of the photodetector dependent on the return light beam from the recording and reproducing plane, and a second signal is generated based on an output signal of the photodetector dependent on the return light beam from the front surface. A signal relating to thickness information on a thickness of the transparent substrate is produced by comparing the first and second signals with each other.

6 Claims, 10 Drawing Sheets

FIG.5a    FIG.5b    FIG.5c
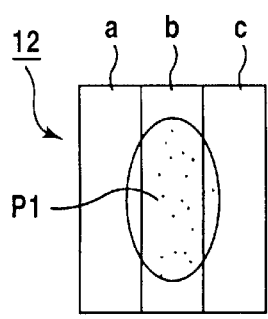
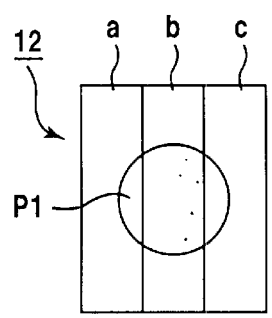
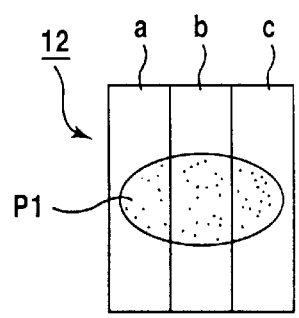
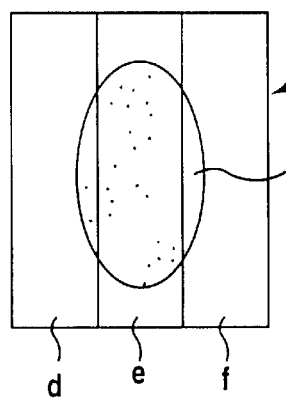
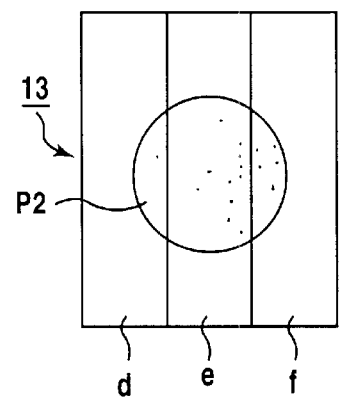
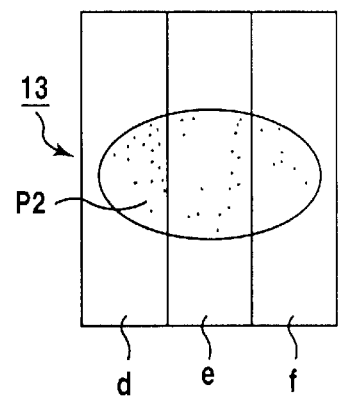

FIG.7a          FIG.7b          FIG.7c
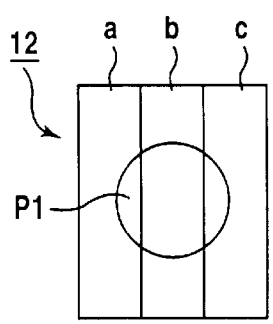
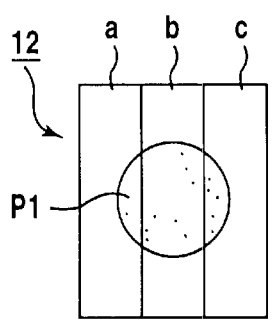
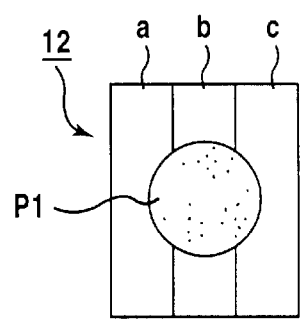
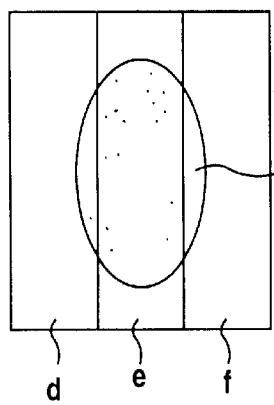
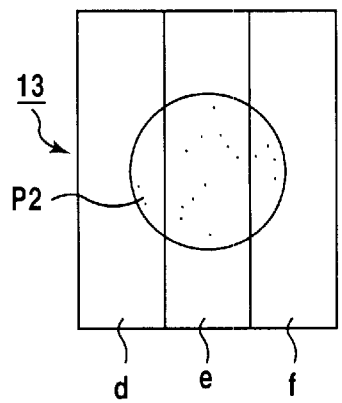
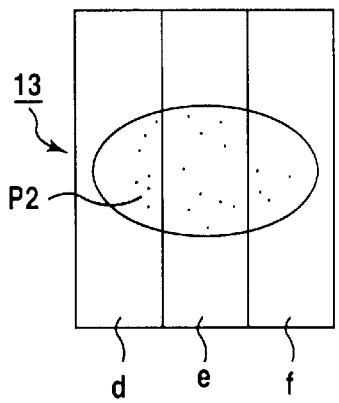

US 6,339,570 B1

OPTICAL PICKUP SYSTEM

BACKGROUND OF THE INVENTION

The present invention relates to an optical pickup system for recording or reproducing data on or from an optical disc.

The optical disc such as the CD and the DVD (Digital Versatile Disc) has the recording and reproducing plane between a transparent substrate and a hard protective layer. Data are recorded or read by applying a laser beam to irradiate the recording and reproducing plane passing through the transparent substrate.

Meanwhile, the thickness of the transparent substrate is not always regular in the entire surface thereof because of manufacturing errors. Generally the error is several ten μm. The variation of the thickness of the transparent substrate causes the spherical aberration at a spot of the laser beam, which reduces the accuracy in recording and reading of information.

Heretofore, the numerical aperture of the objective for focusing the laser beam on the recording and reproducing surface of the disc is adjusted so as to reduce the influence of the spherical aberration.

In recent years, there is required the increase of the recording density with the increase of the information quantity. It is accordingly thought to further increase the numerical aperture of the objective to reduce the diameter of the spot.

However, if the numerical aperture is increased, the allowability to the spherical aberration decreases. As a result, it is difficult to realize the high density recording and the reproducing of the information recorded at a high density.

SUMMARY OF THE INVENTION

An object of the present invention is to provide an optical pickup system which may detect the thickness difference of a disc without reducing the allowability to the spherical aberration.

According to the present invention, there is provided a pickup system for an optical disc having a transparent substrate which has a front surface and a recording and reproducing plane opposite to the front surface, the system comprising, at least one light source for emitting a light beam, light condensing means for applying the light beam from the light source to the recording and reproducing plane and to the front surface of the transparent substrate, at least one photodetector for detecting return light beams from the recording and reproducing plane and the front surface, first signal generating means for generating a first signal based on an output signal of the photodetector dependent on the return light beam from the recording and reproducing plane, second signal generating means for generating a second signal based on an output signal of the photodetector dependent on the return light beam from the front surface, and signal processing means for producing a signal relating thickness information on a thickness of the transparent substrate by comparing the first and second signals with each other.

The light condensing means further has a first area for applying the light beam from the light source to the recording and reproducing plane and a second area for applying the light beam from the light source to the front surface.

The light condensing means has a first area for transmitting the return light beam from the recording and reproducing plane and a second area for transmitting the return light beam from the front surface.

The second area is provided within the first area and transmits the return light beam from the front surface.

These and other objects and features of the present invention will become more apparent from the following detailed description with reference to the accompanying drawings.

BRIEF DESCRIPTION OF DRAWINGS

FIG. 5(a) to FIG. 5(c) show spot patterns of zeroth order light and higher-order light;

FIG. 7(a) to FIG. 7(c) show changes of spot patterns;

FIG. 7(b) shows a same condition as FIG. 5(b);

DETAILED DESCRIPTION OF THE PREFERRED EMBODIMENT

First Embodiment

Figure 1:
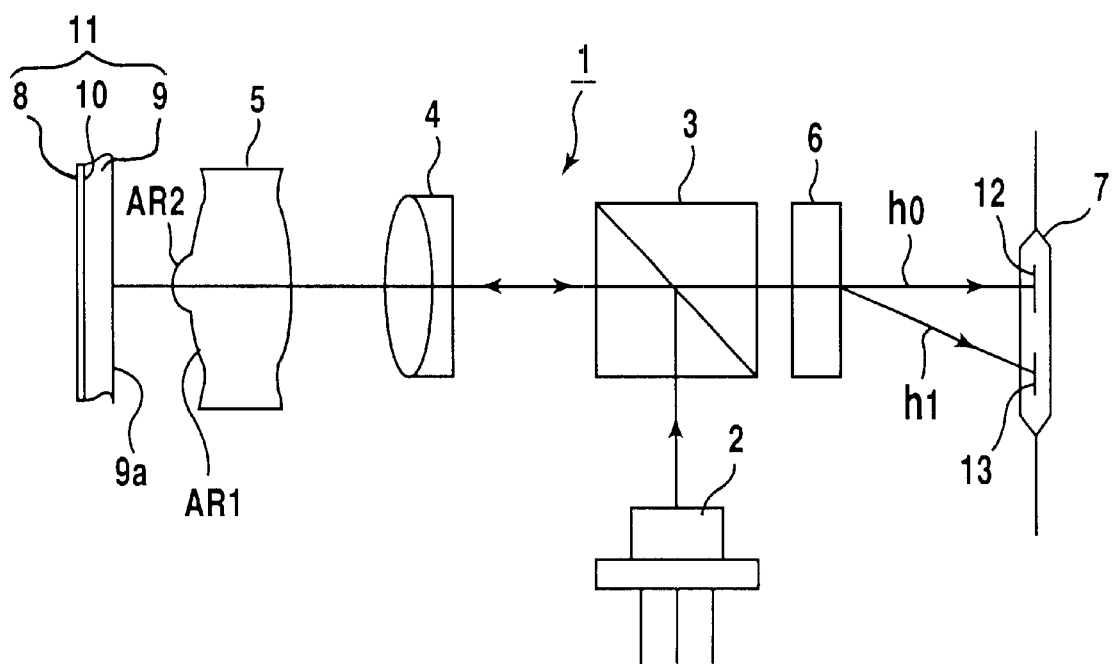
FIG. 1 shows an optical pickup system according to a first embodiment of the present invention.

Referring to FIG. 1 showing an optical pickup system according to the first embodiment of the present invention, the optical pickup system 1 comprises a semiconductor laser 2 as a light source, a beam splitter 3, a collimator lens 4 and an objective 5 as a focusing means which are disposed in front of the beam splitter 3, and a hologram element 6 and a photodetector 7 disposed in the rear of the beam splitter 3. The objective 5 is disposed in front of an optical disc 11 having a recording and reproducing plane 10 between a hard protecting layer 8 and a transparent substrate 9.

A laser beam emitted from the semiconductor laser 2 is reflected or diffracted by the beam splitter 3 to the collimator lens 4. The collimator lens 4 makes the laser beam a parallel light beam. The parallel light beam is divided into outer light focused on the recording and reproducing plane 10 of the optical disc 11 and inner light applied to the surface of the substrate by the objective 5, as described hereinafter in detail. The outer light applied to the optical disc 11 is reflected by the recording and reproducing plane 10 and the outer light is reflected by the surface of the transparent substrate 9. The light beam reflected from the recording and reproducing plane 10 (hereinafter called first return light) and the light beam reflected from the surface 9a of the transparent substrate (hereinafter called second return light) are made parallel light by the objective and applied to the hologram element 6 passing through the collimator lens 4 and the beam splitter 3.

The reflected light beam is diffracted by the hologram element 6 to be divided into zeroth order light h0 and higher-order light h1. The zeroth order light h0 is applied to a first light receiving area 12 of the photodetector 7, and the higher-order light h1 is applied to a second light receiving area 13.

Figure 2:
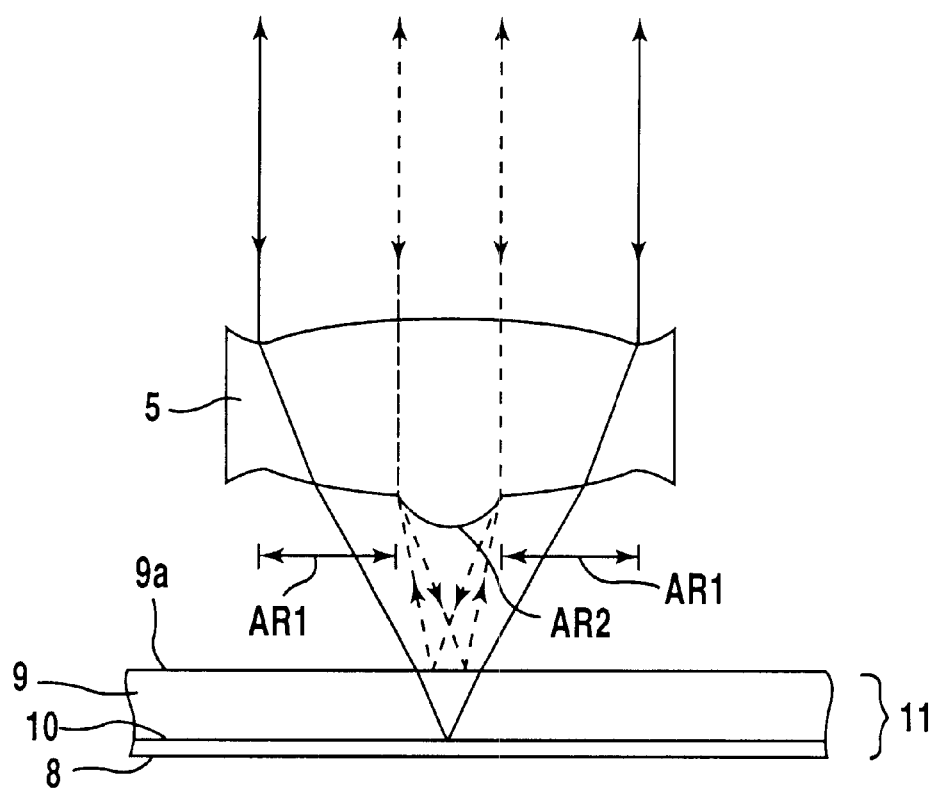
FIG. 2 shows a sectional shape of an objective.

FIG. 2 shows a sectional shape of the objective 5. The front surface of the objective 5 has an annular peripheral portion AR1 having a smaller curvature and a central portion AR2 having a larger curvature. Consequently, the focal length of the central portion AR2 is shorter than that of the peripheral portion AR1.

The curvature of the peripheral portion AR1 is set so that the inner light is focused at a position above the surface 9a of the substrate 9 and is applied to the surface 9a as pattern light when the outer light is focused on the recording and reproducing plane 10. Thus, the light beam passing the objective is divided into two light beams which are different in wavefront.

Thus, the outer light is focused on the recording and reproducing plane 10 and reflected or diffracted by the plane as the first return light. The first return light is made parallel light by the peripheral portion AR1 as shown in FIG. 2.

On the other hand, the inner light is focused at a position above the surface 9a and applied to the surface 9a of the substrate 9 as the pattern light as shown by dotted lines in FIG. 2, and reflected as the second return light. The second return light is made parallel light by the central portion AR2.

Although a part of the central light applied to the recording and reproducing plane 10 passing through the transparent substrate 9, the reached light is diffused pattern light having a low energy density. Hence, the light does not affect the recording or reproducing operation.

In addition, since the central portion AR2 does not affect the outer light focused by the peripheral portion AR1, the outer light is focused as a small spot. Therefore, it is possible to perform the tracking servo operation and the focus servo operation by the small spot.

Figure 3:
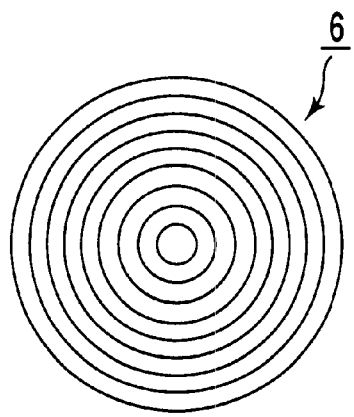
FIG. 3 shows a hologram element.

Referring to FIG. 3 showing the hologram element 6, an annular diffraction pattern is formed in the element. The hologram element 6 passes the zeroth order light h0 in the first and second return light as it is, and the light h0 is applied to the first light receiving area 12. The higher-order light h1 is diffracted by the hologram element 6 and applied to the second light receiving area 13, which diffraction effect is similar to the diffraction effect at a peripheral area of a convex lens.

The photodetector 7 is, for example, composed by an OEIC in which the first and second light receiving areas are integrally formed.

Figure 4:
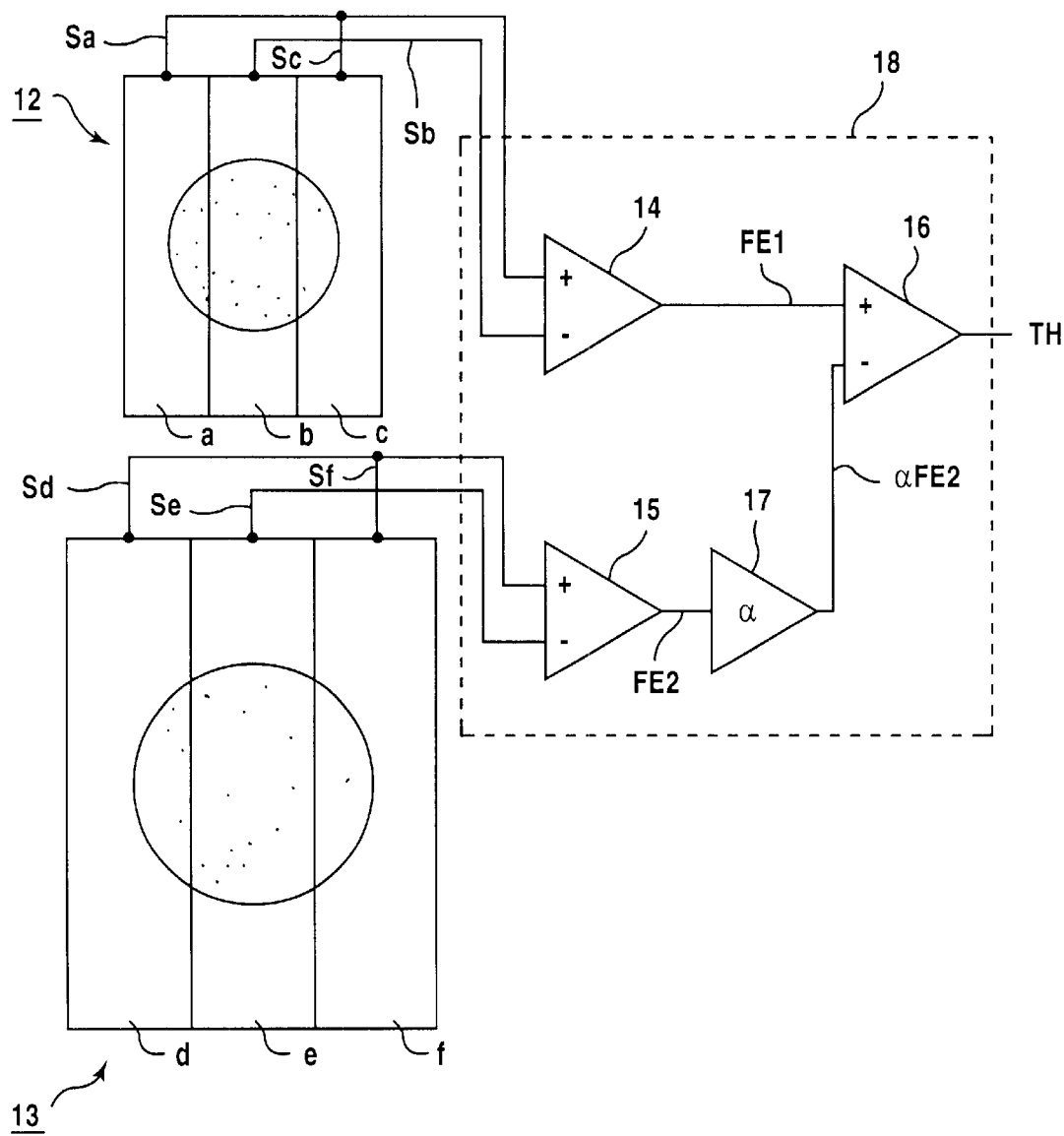
FIG. 4 shows a photodetector.

Referring to FIG. 4 showing the photodetector, the first light receiving area 12 comprises three light receiving elements a, b and c and is positioned so as to receive the zeroth order light h0 of the first return light at a predetermined size.

Similarly, the second light receiving area 13 comprises three light receiving elements d, e and f and is positioned so as to receive the higher-order light h1 at a predetermined size.

These elements a~f are connected to a signal processing circuit 18 comprising differential amplifiers 14, 15, 16 and a differential amplifier 16. The differential amplifiers 14, 15 produce first and second differential output signals FE1 and FE2 from signals Sa~Sf by operating the following equations 1, 2.

$$FE1=(Sa+Sc)-Sb \qquad 1$$

$$FE2=(Sd+Sf)-Se \qquad 2$$

The amplifier 17 has a predetermined amplification factor $\alpha$ and produces an output signal FE2 by operating the following equation 3.

$$\alpha FE2 = \alpha \times FE2 \qquad 3$$

The differential amplifier 16 produces a detecting signal TH representing a thickness error of the transparent substrate 9 by operating the following equation 4.

$$TH=FE1-\alpha FE2 \qquad 4$$

The principle for detecting the thickness error through the signal TH will be described with reference to FIGS. 4~8.

FIG. 5 shows spot patterns of the zeroth order light and the higher-order light on the first and second areas 12, 13 when a disc having a regular thickness is irradiated by the laser beam and the disc is moved in the horizontal direction perpendicular to the optical axis.

The first return light reflected from the recording and reproducing surface 10 passing through the peripheral portion AR1 irradiates the first light receiving area 12 as a first spot pattern P1 as shown in FIG. 5(b). On the other hand, the second return light passing through the central portion AR2 irradiates the second light receiving area 13 as a second spot pattern P2 as shown in FIG. 5(b) (lower one).

If the spot light on the recording and reproducing plane 10 deflects to the left or right, the first return light is reflected and diffracted at the deviated position. The first return light and the second return light irradiate the first and second light receiving areas 12, 13 as patterns P1, P2 shown in FIGS. 5(a), (c). Namely, the pattern becomes a vertically or laterally elongated pattern.

Figure 6:
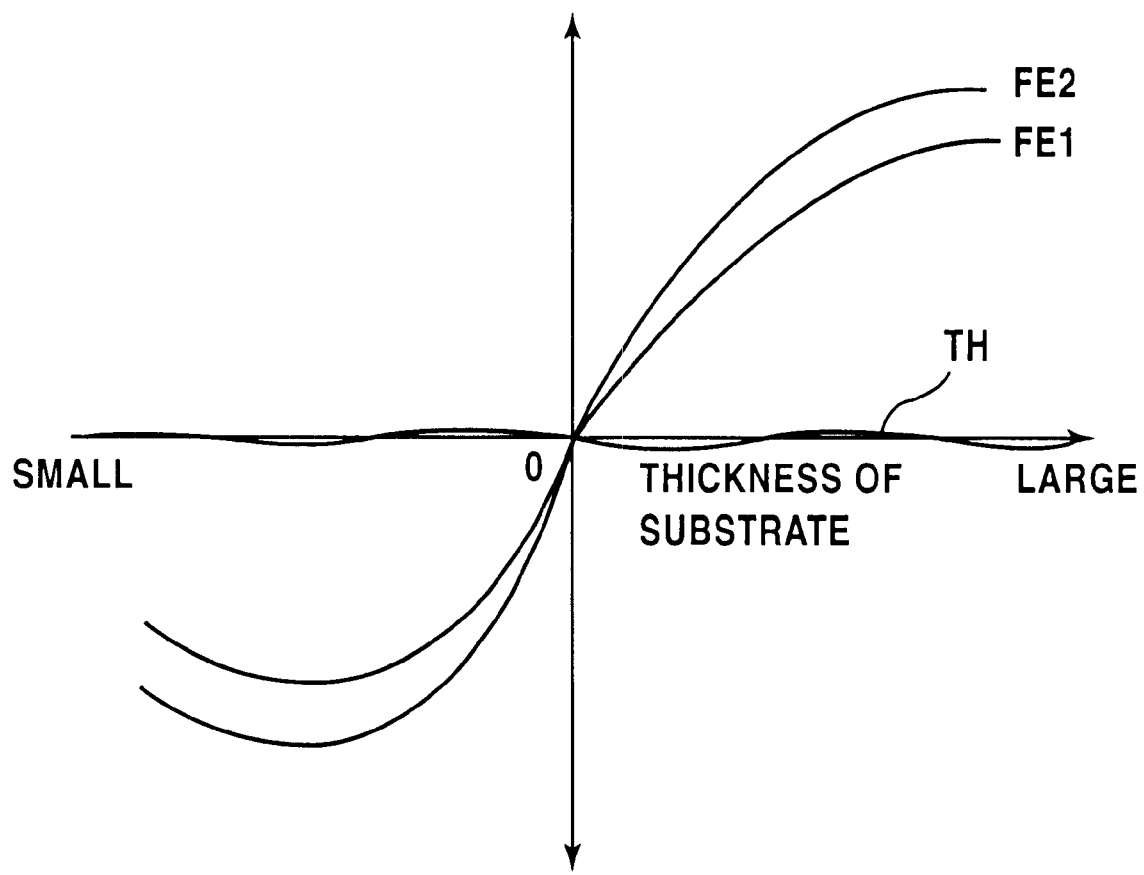
FIG. 6 shows output signals from differential amplifiers.

FIG. 6 shows the first and second output signals FE1 and FE2 from the differential amplifiers 14, 15, in which the output signals change with the deformation of the patterns P1 and P2, wherein the characteristic changes with respect to the condition of FIG. 5(b) as an origin O.

Here, in the case the disc 11 having a regular thickness, the amplification factor $\alpha$ of the amplifier 17 is set to eual value to the ratio of output levels FE1 and FE2 (FE1/FE2). Therefore, the output level of the detected signal TH of the amplifier 16 becomes approximately zero. Namely, the signal TH becomes zero when the disc has not thickness error.

FIG. 7(a) shows changes of first and second spot patterns P1, P2 when a disc having a thinner thickness position than the thickness of the disc of FIG. 5.

FIG. 7(c) shows changes of first and second spot patterns P1, P2 when a disc having a thicker thickness position than the thickness of the disc of FIG. 5.

FIG. 7(b) shows the same condition as FIG. 5(b).

As shown in FIGS. 7(a), (c), in the case of the thin disc, the second pattern P2 is vertically elongated, and in the case of the thick disc, the second pattern P2 changes to laterally elongated form.

Figure 8:
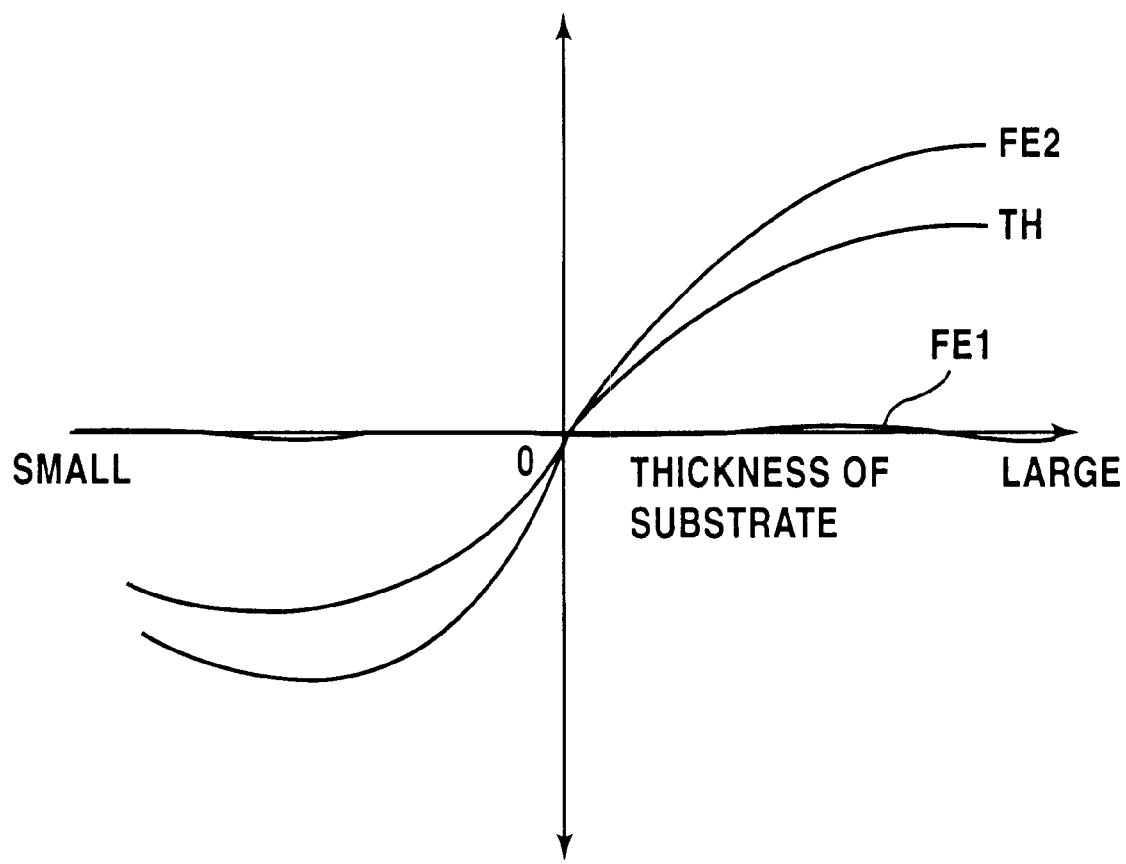
FIG. 8 shows output signals from differential amplifiers.

As shown in FIG. 8, the level of the first output signal FE1 from the differential amplifier 14 is approximately zero, and the levels of the second signal FE2 and the detected signal TH change symmetrically with respect to the origin 0.

As described above, the form of the first pattern P1 changes with the position of the recording and reproducing plans 10 in the optical axis direction, and the form of the second pattern P2 changes with the position of the surface 9a of the substrate 9 in the optical axis direction. Therefore, the first signal FE1 has position information of the recording and reproducing plane 10, and the second signal FE2 has position in formation of the surface 9a. Furthermore, the detected signal TH is the difference between the first and second signals FE1 and FE2, which corresponds to the thickness of the transparent substrate 9.

With respect to the disc having the transparent substrate of an irregular thickness, the characteristic lines of FIG. 8 are obtained, the absolute value of the thickness error of the transparent substrate by measuring the output level of the detected signal TH, and the thickness can be obtained.

By finely adjusting the position of the collimator lens 4 in the optical axis direction in accordance with the detected signal TH so as to control the servo system and others, it is possible to prevent the generation of the spherical aberration caused by the irregular thickness of the transparent substrate 9. In addition, it is possible to change the reproduction equalizer characteristic, recording power, strategy, and others by using the detected signal TH.

Furthermore it is possible to prevent the spherical aberration by providing a spherical aberration adjusting element such as an optical lens and a hologram between the objective 5 and the collimator lens 4, and by adjusting the position of the element with the detected signal TH.

In addition, since the position information of the surface 9a is included in the second signal FE2, the spherical aberration can be corrected with the second signal FE2 and the detected signal TH. Furthermore, it is possible to realize a stable optical system by canceling a remaining focus error with the signal αFE2 and the detected signal TH.

In accordance with the first embodiment, the thickness error of the transparent substrate can be detected with high accuracy.

Second Embodiment

Figure 9:
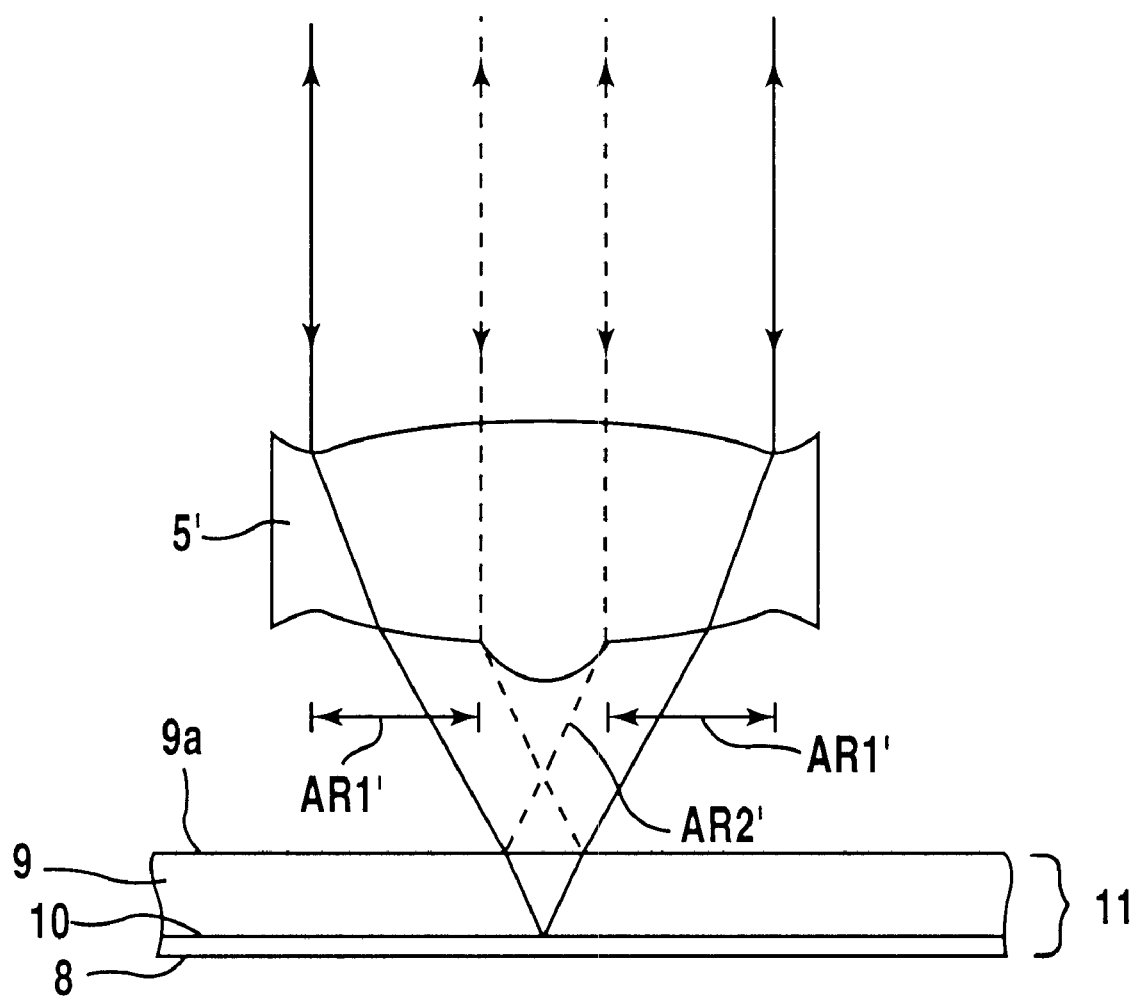
FIG. 9 shows a second embodiment of the present invention.

Referring to FIG. 9 showing the second embodiment of the present invention, the composition of the system of the second embodiment is the same as that of FIG. 1, except an objective 5'. The front surface of the objective 5' has a peripheral portion AR1' and a central portion AR2' having a larger curvature than that of the peripheral portion AR1'.

In the second embodiment, the light reflected from the surface 9a of the substrate 9 (second return light) is condensed to a parallel light beam by the peripheral portion AR1'. The light passing through the peripheral portion AR1' and reflected from the recording and reproducing plane 10 (first return light) is condensed by the peripheral portion AR1' to a parallel light beam. On the other hand, a light beam which is focused at a position outside the beam depicted by the solid lines in FIG. 9 is not applied to the photodetector 7.

Since the central portion AR2' does not participate in the light focused by the peripheral portion AR1', the light is focused on the recording and reproducing plans 10 at a small spot. Therefore, the re-tracking servo and re-focus servo can be done by diffracting the first return light reflected or diffracted on the plane 10. Furthermore it is possible to reproduce the information recorded on the recording and reproducing plane 10 by detecting the first return light by a photoelectric converter (not shown).

Similarly to the first embodiment, the first return light reflected or diffracted on the recording and reproducing plane 10 is applied to the first light receiving area 12, and the second return light reflected from the surface 9a of the transparent substrate 9 is applied to the second light receiving area 13.

When the transparent substrate 9 has an irregular thickness, the first and second patterns P1 and P2 applied to the first and second light receiving areas 12 and 13 change in accordance with the thickness irregularity, and the detected signal TH is produced from the signal processing circuit 18 of FIG. 4.

By finely adjusting the position of the collimator lens 4 in the optical axis direction in accordance with the detected signal TH, it is possible to prevent the generation of the spherical aberration caused by the irregular thickness of the transparent substrate 9. In addition, it is possible to change the reproduction equalizer characteristic, recording power, strategy, and others by using the detected signal TH.

Furthermore it is possible to prevent the spherical aberration by providing a spherical aberration adjusting element such as an optical lens and a hologram between the objective 5 and the collimator lens 4, and by adjusting the position of the element with the detected signal TH.

Although the front surface of each of the objectives 5 and 5' comprises spherical surfaces, the front surface may be formed into non-spherical surfaces. Such a surface is possible to reduce the aberration.

By forming the central portion AR2 into a toric plane, it is possible to give the non-spherical aberration to the light passing through the central portion AR2, thereby using the light for producing a phase detecting signal. The central portion AR2 may be asymmetrical shape.

In the case that the central portion AR2 in the first embodiment is formed into an asymmetrical shape, it is not necessary to coincide the part to which the light is applied from the collimator lens 4 with the part to which the return light is applied from the optical disc 11.

Although the peripheral portion AR1 (AR1') and the central portion AR2 (AR2') are formed on the front surface of the objective 5 (5') in the first and second embodiment, both the portions AR1 and AR2 may be formed on the rear surface of the objective. The objective may be a compound lens or a plurality of layered lens, in which one of the lenses is composed to effect the same function of the portions AR1 and AR2.

Instead of the objective 5 having the spherical peripheral portion AR1 and the central portion AR2 having different curvature than that of the peripheral portion, a hologram element having similar lens effect may be employed. In such a case, since non-diffraction light transmits the hologram element as it is, it is possible to compose such that the light is not entirely shut out at the central portion (a part of paraxial side). Consequently, by adjusting diffraction efficiency, the shape of the spot on the optical disc 11 can variously be changed, thereby increasing the degree of freedom in design.

In accordance with the second embodiment, the thickness error of the transparent substrate can be detected with high accuracy.

Third Embodiment

Figure 10:
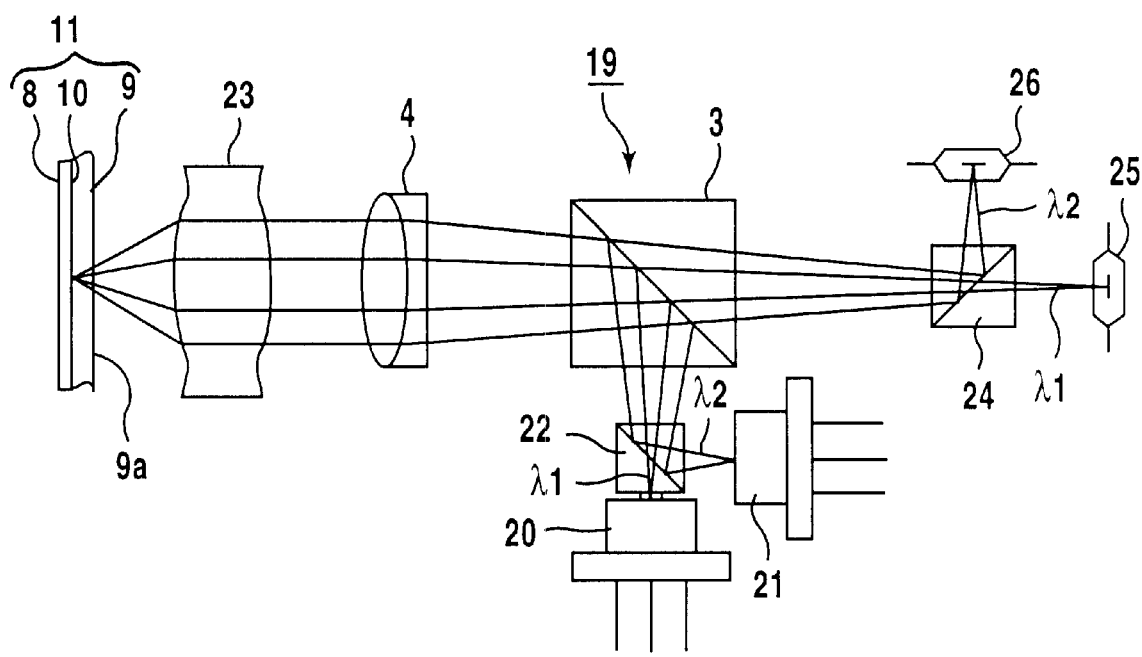
FIG. 10 shows a pickup system of a third embodiment of the present invention.

FIG. 10 shows a pickup system of the third embodiment of the present invention. The same parts as FIG. 1 are identified by the same reference numerals as FIG. 1. The optical pickup system 19 comprises a first semiconductor laser 20 and a second semiconductor laser 21 which emits laser light different from that of the first semiconductor laser 20 in wavelength, a dichroic prism 22, beam splitter 3, collimator lens 4, an objective 23, a dichoric prism 24 disposed in the rear of the beam splitter 3, and first and second photodetectors 25, 26.

The first semiconductor laser 20 is, for example, a blue laser for emitting light having a short wavelength λ1, which is focused on the recording and reproducing plane of the optical disc 11. The second semiconductor laser 21 is, for example, an infrared laser for emitting light having a long wavelength λ2, which is focused on the surface 9a of the transparent substrate 9.

The objective 23 has a front surface of a single face. The shape of the objective is set so that the light of the short wavelength λ1 is focused on the recording and reproducing plane λ2, and the light of the long wavelength λ2 is focused on the substrate surface 9a of the optical disc 11.

The optical axis distance L1 from the first semiconductor laser 20 to the collimator lens 4 and the optical axis distance L2 from the second semiconductor laser 21 to the collimator lens 4 are set to L1<L2. Namely by adjusting the interval between the first and second semiconductor lasers 20, 21 and the dichroic prism 22, the relation of L1<L2 is obtained. By this setting, it is possible to reduce the color aberration, and to adjust the size of the pattern of the long wavelength λ2 on the substrate surface 9a.

A dielectric multilayer having wavelength selectivity is applied on the surface of the dichroic prism 22, so that the light of the short wavelength λ1 passes it and the light of the long wavelength λ2 is reflected, thereby both light beams are applied to the beam splitter 3.

Similarly to FIG. 4, first photodetector 25 has three light receiving elements a, b and c, and the second photodetector 26 comprises three light receiving elements d, e and f. Furthermore the signal processing circuit 18 of FIG. 4 is provided. The processing circuit 18 operates signals Sa~Sf from the light receiving elements a~f to produce the detected signal TH representing the thickness error of the transparent substrate 9.

A dielectric multilayer having wavelength selectivity is applied on the surface of the dichroic prism 24, so that the light of the short wavelength λ1 passes it, and is applied to the first photodetector 25, and the light of the long wavelength λ2 is reflected, and is applied to the second photodetector 26.

In operation, the first and second semiconductor lasers 20 and 21 emit light beams at the same time. These light beams are compounded by the dichroic prism 22 and reflected by the beam splitter 3. The reflected light is condensed by collimator lens 4 to a parallel beam and applied to the optical disc 11 by the objective 23.

The light of the short wavelength λ1 is focused on the recording and reproducing plane 10, and reflected or diffracted by the recording and reproducing plane 10, and the light of the long wavelength λ2 is reflected by the surface 9a of the transparent substrate 9. The light beam reflected from the recording and reproducing plane 10 (first return light) and the light beam reflected from the surface 9a of the transparent substrate 9 (second return light) are condensed to parallel light by the objective and applied to the dichroic prism 24 passing through the collimator lens 4 and the beam splitter 3.

The reflected light beam is divided by the dichroic prism 24 into the light of the short wavelength λ1 and the light of the long wavelength λ2. The short wavelength light is applied to the photodetector 25 and the long wavelength light is applied to the photodetector 26.

Thus, as described above, the detected signal TH is produced.

Thus, by finely adjusting the position of the collimator lens 4 in the optical axis direction in accordance with the detected signal TH so as to control the servo system and others, it is possible to prevent the generation of the spherical aberration caused by the irregular thickness of the transparent substrate 9. In addition, it is possible to change the reproduction equalizer characteristic, recording power, strategy, and others by using the detected signal TH.

Furthermore it is possible to prevent the spherical aberration by providing a spherical aberration adjusting element such as an optical lens and a hologram between the objective 5 and the collimator lens 4, and by adjusting the position of the element with the detected signal TH.

In accordance with the third mbodiment, the thickness error of the transparent substrate can be detected with high accuracy.

Fourth Embodiment

Figure 11:
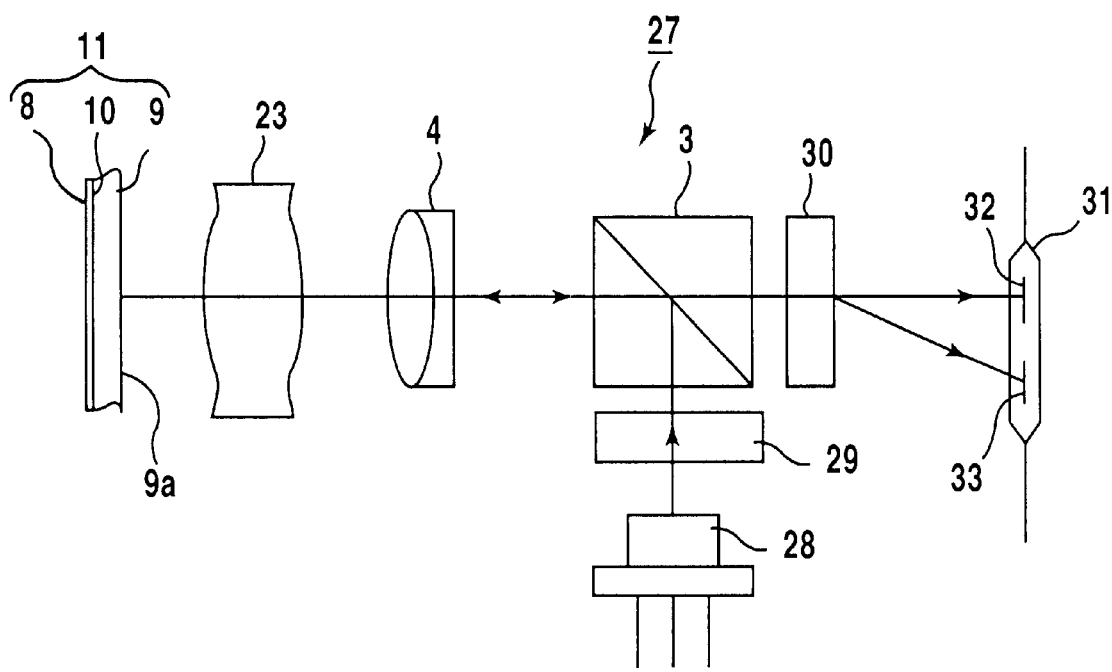
FIG. 11 shows a pickup system of a fourth embodiment of the present invention.

Referring to FIG. 11 showing a pickup system 27 of the fourth embodiment of the present invention, a first hologram element 29 is provided between a semiconductor laser 28 and the beam splitter 3, and a second hologram element 30 and a photodetector 31 are provided behind the beam splitter 3.

The first hologram element 29 is similar to the convex lens, and hence has a diffraction pattern for diffracting the light passing a peripheral portion thereof. The second hologram element 30 has a diffraction pattern similar to the diffraction effect of the concave lens.

The photodetector 31 has a first light receiving area 32 and a second light receiving area 33 which have light receiving surfaces capable of detecting a two-dimensional image.

Thus, the light emitted from the semiconductor laser 28 is divided into real image light and virtual image light by the first hologram 28.

The real image light is applied to the recording and reproducing plane 10 and the virtual image light is applied to the surface 9a of the transparent substrate 9.

The return light beam is condensed by the objective 23 and applied to the second hologram element 30 passing through the collimator lens 4 and the beam splitter 3. The return light beam is expanded by the second hologram element 30 and applied to first and second light receiving areas 32 and 33 of the photodetector 31.

The first light receiving area 32 converts the real image light to a first image signal and the second light receiving area 33 converts the virtual image light to a second image signal. By comparing the first and second image signals with each other, the information TH on the thickness error of the transparent substrate is obtained, because the first image signal includes the information on the position of the recording and reproducing plane 10, and the second image signal includes the information on the position of the substrate surface 9a.

Thus, by finely adjusting the position of the collimator lens 4 in the optical axis direction in accordance with the detected signal TH so as to control the servo system and others, it is possible to prevent the generation of the spherical aberration caused by the irregular thickness of the transparent substrate 9. In addition, it is possible to change the reproduction equalizer characteristic, recording power, strategy, and others by using the detected signal TH.

Furthermore it is possible to prevent the spherical aberration by providing a spherical aberration adjusting element such as an optical lens and a hologram between the objective 23 and the collimator lens 4, and by adjusting the position of the element with the detected signal TH.

In the system of the present invention, the position of the recording and reproducing plane on the optical axis and the position of the surface of the transparent substrate of the optical disc are detected, and the thickness error of the transparent substrate is obtained based on the thickness error. Therefore, it is possible to precisely detect the thickness error.

Consequently, even if a focusing means such as an objective having a high numerical aperture is employed, it is possible to increase the allowability for the spherical aberration, thereby enabling to increase the recording density on the optical disc and to reproduce the information recorded at a high density.

While the invention has been described in conjunction with preferred specific embodiment thereof, it will be understood that this description is intended to illustrate and not limit the scope of the invention, which is defined by the following claims.

What is claimed is:

1. A pickup system for an optical disc having a transparent substrate which has a front surface and a recording and reproducing plane opposite to the front surface, the system comprising:

at least one light source for emitting a light beam;

light condensing means for applying the light beam from the light source to the recording and reproducing plane and to the front surface of the transparent substrate;

at least one photodetector for detecting return light beams from the recording and reproducing plane and the front surface;

first signal generating means for generating a first signal based on an output signal of the photodetector dependent on the return light beam from the recording and reproducing plane;

second signal generating means for generating a second signal based on an output signal of the photodetector dependent an the return light beam from the front surface; and signal processing means for producing a signal relating to thickness information on a thickness of the transparent substrate by comparing the first and second signals with each other.

2. The system according to claim 1 wherein the light condensing means has a first area for applying the light beam from the light source to the recording and reproducing plane and a second area for applying the light beam from the light source to the front surface.

3. The system according to claim 1 wherein the light condensing means has a first area for transmitting the return light beam from the recording and reproducing plane and a second area for transmitting the return light beam from the front surface.

4. The system according to claim 3 wherein the second area is provided within the first area and transmits the return light beam from the front surface.

5. The system according to claim 1 wherein the light emitted from the light source is divided into a plurality of light beams which are different in wavefront, one of the light beams is applied to the recording and reproducing plane, and the other light beam is applied to the surface of the transparent substrate.

6. The system according to claim 1 further comprising a hologram element for converting the light beam from the light source into a plurality of light beams.

* * * * *